United States Patent
Agrawal et al.

(10) Patent No.: US 12,307,240 B2
(45) Date of Patent: May 20, 2025

(54) QUIESCENT OPERATION OF NON-DISRUPTIVE UPDATE OF A DATA MANAGEMENT SYSTEM

(71) Applicant: Rubrik, Inc., Palo Alto, CA (US)

(72) Inventors: Smriti Agrawal, Sunnyvale, CA (US); Schuyler Merritt Smith, San Francisco, CA (US); Patricia Ann Beekman, Palo Alto, CA (US); Pooja Sinha, Bengaluru (IN); Vabilisetti Mohan Abhyas, Bengaluru (IN); Ajay Shekar, San Francisco, CA (US)

(73) Assignee: Rubrik, Inc., Palo Alto, CA (US)

( * ) Notice: Subject to any disclaimer, the term of this patent is extended or adjusted under 35 U.S.C. 154(b) by 327 days.

(21) Appl. No.: 17/948,145

(22) Filed: Sep. 19, 2022

(65) Prior Publication Data
US 2024/0095021 A1  Mar. 21, 2024

(51) Int. Cl.
*G06F 8/656* (2018.01)
*G06F 16/27* (2019.01)

(52) U.S. Cl.
CPC .............. *G06F 8/656* (2018.02); *G06F 16/27* (2019.01)

(58) Field of Classification Search
CPC .......... G06F 8/656; G06F 8/654; G06F 16/27
See application file for complete search history.

(56) References Cited

U.S. PATENT DOCUMENTS

| | | | |
|---|---|---|---|
| 7,921,328 B1* | 4/2011 | Gulati | G06F 11/2074 |
| | | | 714/15 |
| 10,990,286 B1* | 4/2021 | Srinivasan | G06F 11/0727 |
| 11,914,686 B2* | 2/2024 | Pabón | G06F 21/60 |
| 2010/0153524 A1* | 6/2010 | Rehm | H04L 67/1001 |
| | | | 709/221 |
| 2017/0090912 A1* | 3/2017 | Fuglsang | G06F 8/30 |
| 2017/0109198 A1* | 4/2017 | Sugimoto | G06F 3/1261 |
| 2018/0081673 A1* | 3/2018 | Mutreja | G06F 8/656 |
| 2019/0068699 A1* | 2/2019 | Nethercutt | H04L 65/4015 |
| 2020/0329097 A1* | 10/2020 | Kumbi | G06F 9/4881 |
| 2021/0132812 A1* | 5/2021 | Srinivasan | G06F 3/0659 |
| 2022/0222224 A1* | 7/2022 | Pandey | G06F 8/65 |

OTHER PUBLICATIONS

Christopher M. Hayden, A study of dynamic software update quiescence for multithreaded programs, Jun. 2012, IEEE, (Year: 2012).*

* cited by examiner

*Primary Examiner* — Wei Y Zhen
*Assistant Examiner* — Amir Soltanzadeh
(74) *Attorney, Agent, or Firm* — Holland & Hart LLP

(57) ABSTRACT

Aspects of data management are described. During an update procedure for serially updating a cluster of storage nodes, a storage node of the cluster of storage nodes may enter a quiescent state. While in the quiescent state, the storage node may refrain from obtaining new jobs and may continue to execute jobs that were initiated at the storage node prior to entering the quiescent state. The storage node may enter the quiescent state while another storage node enters an update state for installing the update version. The storage node may also post, to a job queue, jobs running at the storage node that are terminated at an end of the quiescent state.

19 Claims, 8 Drawing Sheets

QUIESCENT OPERATION OF NON-DISRUPTIVE UPDATE OF A DATA MANAGEMENT SYSTEM

FIELD OF TECHNOLOGY

The present disclosure relates generally to data management, including techniques for quiescent operation of non-disruptive update of a data management system.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

To update the software of a cluster of storage nodes in a non-disruptive manner, an update procedure may serially update subsets (e.g., one or more) of the storage nodes. Accordingly, the storage nodes that are not being updated may continue to support services provided by the cluster of storage nodes throughout the update procedure. When a non-disruptive update is performed, if a next storage node to be updated begins installing an update immediately after a preceding storage node completes an update, any tasks currently being executed by the next storage node to be updated may be stopped and fail—e.g., since storage nodes that are not currently being updated continue to execute jobs throughout a non-disruptive update procedure.

To reduce and accommodate job failures that occur during a non-disruptive update procedure, a storage node may observe a quiesce period prior to installing an update at the storage node. While in the quiescent state, the node may refrain from beginning new jobs (e.g., may refrain from scanning the global job queue) and may execute jobs (e.g., in-process jobs) in the local job queue at the storage node.

In some examples, implementing a quiesce period, may increase a duration of a non-disruptive update procedure. To reduce a duration of a non-disruptive update that uses quiescing, an update state performed at a storage node being updated may be configured to overlap with a quiescent state at another storage node (e.g., the next storage node to be updated). In some examples, update threads may be used to support overlapping the states of the storage nodes. The update threads may also be used to maintain a record of the current states of the storage nodes, where the record may be used to resume an update procedure if the update procedure is restarted, paused, or fails.

Figure 1:
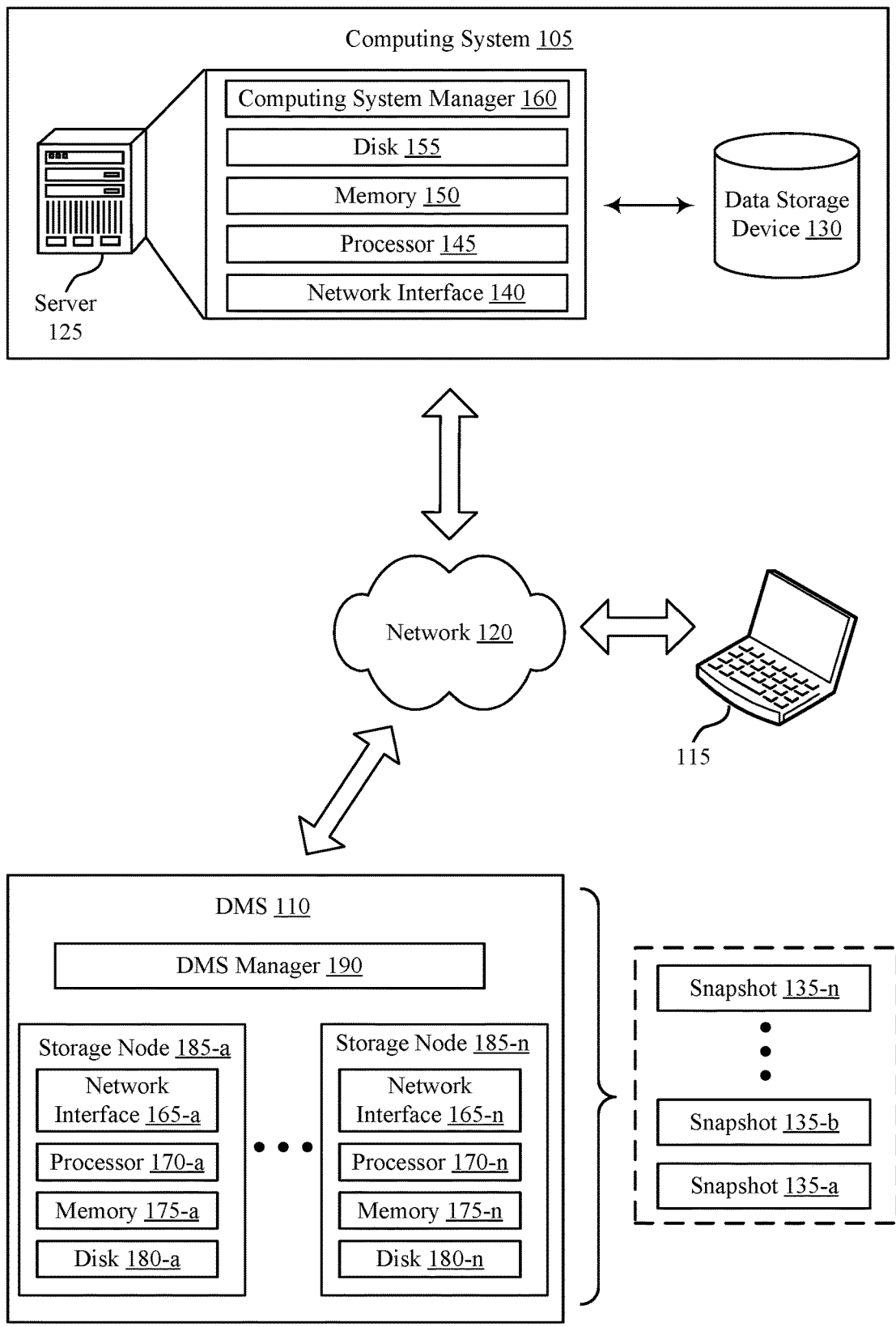
FIG. 1 shows an example of a computing environment that supports quiescent operation of non-disruptive update of a data management system in accordance with aspects of the present disclosure.

FIG. 1 illustrates an example of a computing environment 100 that supports quiescent operation of non-disruptive update of a data management system in accordance with aspects of the present disclosure. The computing environment 100 may include a computing system 105, a data management system (DMS) 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory ((ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots, including for the same computing object. For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

A storage cluster at the DMS 110 may be updated (e.g., upgraded) from a first software version to a second software version—e.g., to improve performance, stability, and/or security; to add new services; etc. As part of the procedure for updating the storage cluster, each of the storage nodes 185 may be updated from the first software version to the second software version. To perform the update procedure, each of the storage nodes may be taken offline while the update procedure is performed. A duration for performing the update procedure may last tens of minutes or hours. Accordingly, the services provided by the storage cluster may be temporarily unavailable until the update procedure is completed. An update procedure that causes the storage cluster to be taken offline may be referred to as a "disruptive" update procedure.

Alternatively, a "non-disruptive" update procedure may be performed to update the storage cluster. As part of the non-disruptive update procedure, individual (or groups of) storage nodes may be updated from the first software version to the second software version (e.g., on a serial or one-byone basis). A procedure for serially updating the storage nodes may be referred to as a rolling update procedure. Accordingly, the storage cluster may continue to provide services (remain online) throughout the update procedure. That is, the storage nodes not being currently updated may be used to support the services provided by the storage cluster. Since a non-disruptive update procedure may involve individually updating the storage nodes 185 (or groups of the storage nodes 185), a duration for performing the non-disruptive update procedure may last hours or days. For example, the duration of the non-disruptive update procedure may include the collective time of individually updating each of the storage nodes 185.

In some examples, during an update procedure for serially updating a cluster of storage nodes, a storage node of the storage nodes 185 may enter a quiescent state. While in the quiescent state, the storage node may refrain from obtaining new jobs and may continue to execute jobs that were initiated at the storage node prior to entering the quiescent state. The storage node may post, to a job queue, jobs running at the storage node that are terminated at an end of the quiescent state. In some examples, the storage node may enter the quiescent state while another storage node of the storage nodes 185 enters an update state for installing the update version—e.g., to reduce a duration of the update procedure.

In some examples, the DMS manager 190 (or a "driving storage node" of the storage nodes 185 that is designated as the driving node for the update procedure) may create multiple threads for updating each of the storage nodes. The multiple threads may be used to facilitate overlapping update operations of one storage node (e.g., installation operations) with update operations of another storage node (e.g., preparatory operations, such as quiescent operations). The multiple threads may also be used to monitor a state of the storage nodes 185 throughout the update procedure and to record a point for resuming the update procedure in the event the update procedure is interrupted or restarted.

Figure 2:
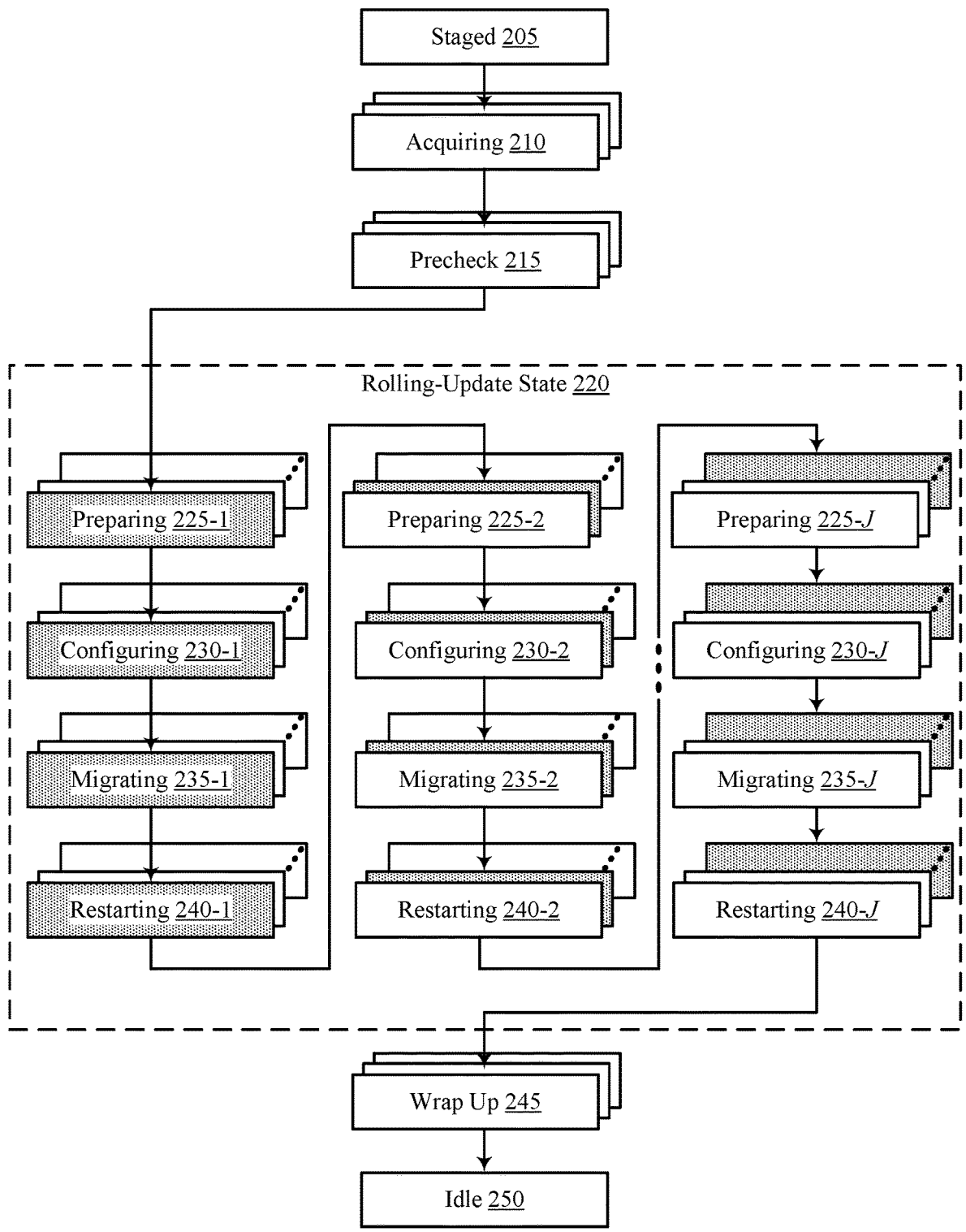
FIG. 2 shows an example of a state diagram that supports quiescent operation of non-disruptive update of a data management system in accordance with examples as disclosed herein.

FIG. 2 shows an example of a state diagram that supports quiescent operation of non-disruptive update of a data management system in accordance with examples as disclosed herein.

The state diagram 200 may depict the different states of a data management cluster during a non-disruptive update procedure. The state diagram 200 may include cluster-wide states that include first tasks that are performed on the storage nodes collectively, and node-level tasks that are performed on storage nodes individually. The state diagram 200 may depict the operation of a cluster-wide state machine associated with the data management cluster as well as one or more nested node-level state machines associated with the storage nodes. A nested node-level state machine may also be referred to as a rolling update (RU) state machine.

Based on receiving an indication that an update for the data management cluster is available, the cluster-wide state machine and the data management cluster may enter the staged state 205. Based on entering the staged state 205, the data management cluster may be ready for a procedure for non-disruptively updating the data management cluster from a first software version to a second software version to be initiated. In some examples, prior to entering the staged state 205, the data management cluster may download the update and confirm an integrity of the update, for example. In some examples, each storage node in the data management cluster may concurrently (e.g., simultaneously) transition to the staged state 205 together.

After the staged state 205 is entered and the rolling update is initiated, the cluster-wide state machine and data management cluster may enter the acquiring state 210. Based on entering the acquiring state 210, the data management cluster may acquire an update-lock protecting the data management cluster from changes that would interfere with the rolling update process. In some examples, each storage node in the data management cluster may concurrently (e.g., simultaneously) transition to the acquiring state 210 together.

In some examples, before proceeding with the rolling update, the cluster-wide state machine and the data management cluster may enter the precheck state 215. While in the precheck state 215, the data management cluster may perform one or more checks to determine whether to proceed with the rolling update. In some examples, the data management cluster performs one or more cluster-wide (or system-wide) checks to determine whether to proceed with the rolling update. Additionally, or alternatively, the data management cluster may perform one more individual node-level checks to determine whether to proceed with the rolling update. In some examples, a deploying state may be inserted between the acquiring state 210 and the precheck state 215. The deploying state may be used to deploy the update to the storage nodes.

Based on passing the prechecks and/or addressing any outstanding items raised by the prechecks, a status of the storage nodes may be set to OK (which may indicate to the services being run by the data management cluster that the storage node is available to support the services), and the cluster-wide state machine and the data management cluster may enter the rolling update state 220. Based on entering the rolling update state 220, a plan for updating the data management cluster may be determined. For example, the plan may designate an order for updating the storage nodes (e.g., individually or in groups). Also, a node-level finite state machine (which may be referred to as a state machine) may be instantiated. In some examples, a state machine is instantiated for each storage node (e.g., of N storage nodes) or for sets of the storage nodes in the data management cluster. Though, in some examples, the state machines may be instantiated prior to entering the rolling update state 220 (e.g., when the staged state 205 is entered). Based on instantiating the state machines, the states of the state machines and state handlers for the various states may be established.

The states of the individual state machines may be represented by the overlaid boxes, such that the frontmost boxes may correspond to a first state machine for a first storage node, the intermediary boxes may correspond to a second state machine for a second storage node, and the backmost boxes may correspond to a third state machine for an Nth storage node. Each state machine may include a preparing state, a configuring state, a migrating state, and a restarting state. In some examples, each state machine may also include a done state to indicate that the update at a corresponding node is complete.

The state machines may perform the tasks of some states in parallel. That is, the storage nodes may perform the tasks of some states concurrently—e.g., one or more tasks of the preparing state. While the tasks of other states may be performed serially. That is, the storage nodes may not perform certain tasks until certain tasks are completed by a particular storage node—e.g., one storage node may not perform the tasks of the configuring, migrating, and restarting states until a particular storage node completes the tasks of the configuring, migrating, and restarting states; another storage node may not perform the tasks of the configuring, migrating, and restarting states until the one storage node completes tasks of the configuring, migrating, and restarting states, and so on. In some examples, which tasks are performed by the storage nodes serially or in parallel may be modified by modifying the operation of the individual nested state machines. In some examples, for each task performed for a state machine, a file may be updated before and after the task is performed to record the current state and quantity of tasks performed by each node. After completing the tasks of a current state, a state machine may proceed to the next state. In some examples, if the state machine encounters an error, the state machine, the rolling update, or both, may be paused.

After the rolling update state 220 is entered and the state machines are instantiated, a first state machine at the first storage node may enter the preparing state. In some examples, based on entering the first preparing state 225-1, the first storage node corresponding to the first state machine may stop providing services and identify ongoing jobs for the services. Also, a status of the first storage node may be set to UPDATE (to indicate that the first storage node is being updated). In some examples, the first storage node may perform a quick reboot. While the first storage node is in the first preparing state 225-1, a status of the other storage nodes corresponding to the other state machines may be set to OK. While the OK status is set, the other storage nodes may continue to execute ongoing jobs to support services provided by the data management cluster.

The first state machine and the first storage node may then proceed to the first configuring state 230-1. While in the first configuring state 230-1, the first storage node may configure a secondary partition with system settings, apply platform specific changes, and perform a regular reboot. In some examples, the first storage node may make additions and/or modifications to the configuration of an operating system of the first storage node, the data management software of the first storage node, or both. In some examples, the first storage node may make additions and/or modifications to the configuration of virtual machines, physical machines, or both. A configuration may include configuration parameters, where each configuration parameter may have a specified value.

Based on updating the configurations, the first state machine and the first storage node may then proceed to the first migrating state 235-1. While in the first migrating state 235-1, the first storage node may prepare the updated software version for operation. For example, the first storage node may convert existing data into different forms; populate, modify, or remove a schema added in the updated software version; populate, modify, or remove entries of a schema modified in the updated software versions; and the like.

After initializing the updated software version, the first state machine and first storage node may enter the first restarting state 240-1. While in the first restarting state 240-1, the first storage node may restart itself—e.g., so that the first storage node (the services provided by the first storage node) may begin operating in accordance with the updated software version. In some examples, after successfully restarting, the first state machine and the first storage node may transition to a done state and a status of the first storage node may be reset to OK.

Based on the first storage node successfully restarting, a next state machine and a next storage node may enter and perform the tasks of the second preparing state 225-2. Also, a status of the next storage node may be set to UPDATE.

After completing the tasks of the second preparing state 225-2, the next state machine and the next storage node may proceed through the second configuring state 230-2, the second migrating state 235-2, and the second restarting state 240-2 of the second state machine, as similarly described with reference to the first storage node. Based on the next storage node successfully restarting, a following state machine and following storage node may proceed through the tasks of the preparing and subsequent states. And so on—e.g., until all of the storage nodes have been updated.

Based on a last storage node (e.g., the $J^{th}$ storage node 225-J) exiting the last restarting state (e.g., the $J^{th}$ restarting state 240-J), the cluster-wide state machine may proceed to the wrap-up state 245. In some examples, the $J^{th}$ storage node 225-J is the storage node that drives the rolling update procedure (and may be referred to as the driving node). While in the wrap-up state 245, certain data in the storage nodes may be deleted (e.g., cleaned-up)—e.g., data that is preferable not to delete during the rolling update, such as old or obsolete metadata, system configurations, and the like. In some examples, destructive schema changes may also be performed while in the wrap-up state. Additionally, an update status of OK may be designated for the data management cluster (to indicate that the rolling update was completed successfully). After completing the wrap-up operations, the cluster-wide state machine may proceed to the idle state 250.

As described herein, if a non-disruptive update is performed, the data management cluster may continue to support the operation of services throughout the non-disruptive update. Accordingly, the storage nodes in the data management cluster may continue to execute jobs (e.g., clean up jobs, garbage collection jobs, backup jobs, snapshot jobs, etc.) that support the services throughout the non-disruptive update. As part of executing a job, a storage node (or group of storage nodes) may perform a set of tasks. In some examples, the storage nodes run multiple instances of a job—e.g., for a backup service, the storage nodes may run a first instance of a backup job for a first set of folders, a second instance of a backup job for a second set of folders, etc.

A storage node may include a job fetcher that monitors a global job queue and loads one or more instances of one or more jobs from the global job queue into a local job queue at the storage node—e.g., if the start time of the jobs in the global job queue has passed. After loading the one or more jobs, the storage node may proceed to perform the one or more jobs. While being executed, an instance of a job may transition through multiple job states (e.g., acquiring, running, undoing, cancelling, and finishing) of a job-specific state machine. The storage node may clear the local job queue upon completion of the loaded jobs. Based on clearing the local job queue of an instance of job, the storage node may add a clean-up job to a clean-up job queue to delete temporary data created by the instance of the job during execution, delete data that is obsolete after the job is completed (e.g., old or obsolete schemas, system configurations, etc.), or both. In some examples, based on completing the instance of job, the storage node may indicate that the job completed successfully and may schedule a next instance of the job—e.g., by posting the next instance of the job to the global job queue.

In some cases, a storage node may fail to complete an instance of a job—e.g., a task of the job instance may fail. If the task is a retriable task, the storage node (or another storage node if the storage job posts the instance of the job to the global storage queue) may try again to complete the task (e.g., one or more times). For example, the storage node (or the other storage node) may resume the execution of the task from a prior checkpoint reached by the instance of the job. A job that includes retriable tasks may be referred to as a resumable job. In some examples, one or more tasks used to complete a job are retriable (e.g., the longest tasks), and one or more checkpoints may be designated throughout the one or more retriable tasks. Otherwise, if the tasks in a job instance are not retriable, the instance of the job may fail, and the storage node may clean up information generated or changed by the partial execution of the job instance. In some examples, a new instance of the job may be posted to the global job queue as a retry, where the new instance of the job may be picked up by the same storage node or another storage node.

Since storage nodes that are not currently being updated continue to execute jobs throughout a non-disruptive update, if a next storage node to be updated begins installing an update as soon as the update is installed on the preceding storage node, any tasks currently being executed by that next storage node may be stopped and therefore fail.

For jobs that are not resumable, the instance of the job may also fail, and a new instance of the job may be posted to the global job queue. That said, if the job has failed a threshold quantity of times, a new instance of the job may not be reposted to the global job queue. In some examples, the data management cluster may provide (e.g., to a user via a user interface) an indication that a job has failed—even if the failure was not caused by an issue with executing the instance of the job but by the non-disruptive update procedure. In some examples, the data management cluster provides the indication only if the job has failed a threshold quantity times.

For jobs that are resumable, a retriable task may be stopped before it reaches a checkpoint. In some examples, the same instance of the job may be reposted to the global job queue, however significant progress made by the retriable task prior to the checkpoint may be lost. Also, if the instance of the job has failed a threshold quantity of times, the data management cluster may provide (e.g., to a user via a user interface) an indication that the job has failed—even if the failure was not caused by an issue with executing the instance of the job but by the non-disruptive update procedure.

To reduce and accommodate job failures that occur during a non-disruptive update procedure, a storage node may observe a quiesce period prior to installing an update at the storage node. The quiesce period may last for minutes (e.g., 5 to 30 minutes). While in the quiescent state, the node may refrain from beginning new jobs (e.g., may refrain from scanning the global job queue) and may execute jobs (e.g., in-process jobs) in the local job queue at the storage node. In some examples, while in the quiescent state, the storage node may only refrain from beginning new jobs that are unable to be completed within the quiesce period—that is, the storage node may scan the global job queue for jobs that can be completed before the quiesce period ends. In some examples, the quiesce period occurs while a storage node is in the preparing state. As part of entering the quiesce period, the status of the storage node may be set to OK-quiesce (which may indicate to the services being run by the data management cluster that the storage node is still available to support the services but to the job fetcher that the storage node is to be updated soon). When the quiesce period expires, the storage node may terminate any ongoing jobs and the status of the storage node may be set to UPDATE.

By implementing a quiesce period, a quantity of job failures caused by updating a storage node may be reduced. Additionally, processing associated with monitoring and retrying failed jobs during an updated procedure may be reduced. Accordingly, a disruption to services being supported by a data management cluster during a non-disruptive update may be reduced.

Implementing a quiesce period, may increase a duration of a non-disruptive update procedure. For example, if each storage node is quiesced individually, the duration of the non-disruptive update may increase by a duration of the quiesce period times the quantity of storage nodes. In some examples, the duration of the quiesce period may be a substantial percentage of the duration for updating a storage node (e.g., up to 50%).

To reduce a duration of a non-disruptive update that uses quiescing, an update state performed at a storage node being updated may be configured to overlap with a quiescent state at another storage node (e.g., the next storage node to be updated). In some examples, the ability to overlap an update state of one node with a quiesce state of one or more other nodes may be configured for data management clusters with a threshold quantity of storage nodes—e.g., because multiple nodes may be simultaneously unable to pull jobs from the global job queue. For example, the ability to overlap and update and quiesce state may be configured for data management clusters having greater than eight storage nodes. In some examples, to support overlapping update and quiesce states, a driving storage node may create a first thread for running the update process on a storage node being updated and a second thread for running the update process on a next storage node to be updated.

By overlapping quiescent activity of one storage node with an update installation at another storage node during a rolling update, a portion of an update procedure for one storage node may be overlapped with a portion of an update procedure of another storage node, and a duration of the non-disruptive update may be reduced.

Also, as described herein, different storage nodes may be using different software versions at any one time during a non-disruptive update procedure. In some examples, a job that fails at an updated storage node may be reposted in the global storage queue and loaded by a storage node that has not been updated, and vice versa. In such cases, the updated storage node may create the job instance that is reposted at the global storage queue in accordance with the updated software version currently installed at the updated storage node. In some examples, a failure may occur if a non-updated storage node retries the reposted job—e.g., due to changes in the code for executing the job code with the second software version.

To prevent a non-updated storage node from executing a retry of a job instance created by an updated storage node, the data management cluster may monitor the software version of a storage node that creates an instance of a job. In such cases, a non-updated storage node may check whether a storage node running the non-updated or the updated software version was used to create the instance of the job. The non-updated storage node may refrain from pulling the job from the global job queue based on determining that the instance of the job was created by an updated storage node.

Figure 3:
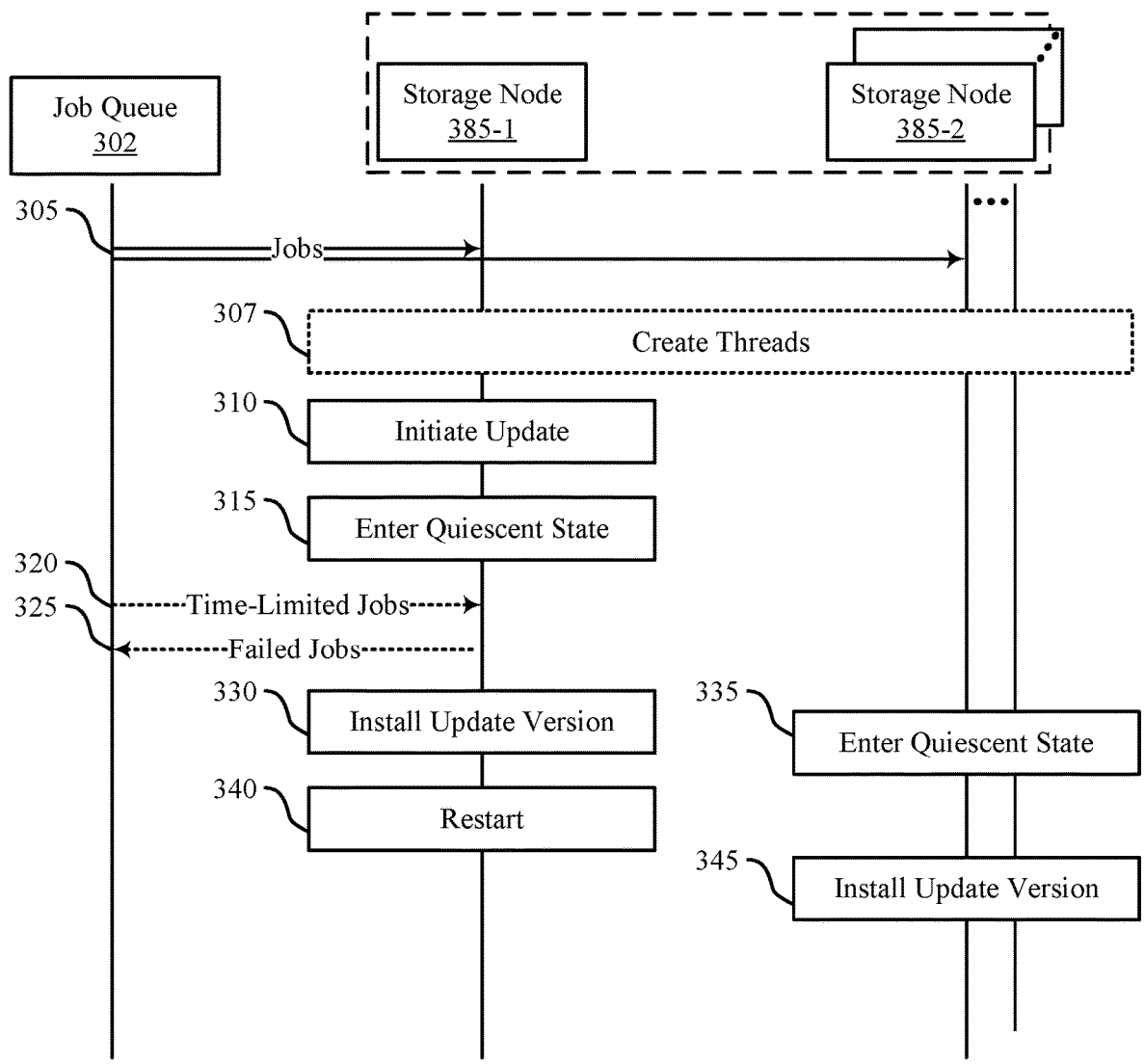
FIG. 3 shows an example of a set of operations for quiescent operation of non-disruptive update of a data management system in accordance with examples as disclosed herein.

FIG. 3 shows an example of a set of operations for quiescent operation of non-disruptive update of a data management system in accordance with examples as disclosed herein.

The process flow 300 may be performed by a data management cluster including multiple storage nodes, which may be respective examples of the storage nodes described herein. In some examples, the process flow 300 shows an example set of operations performed to support quiescent operation of non-disruptive update of a data management system. For example, the process flow 300 may include operations for executing jobs during a quiescent period as well as overlapping an installation of an update at one storage node with a quiescent period at one or more other storage nodes.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

At 305, the storage nodes 385 may obtain instances of jobs from the job queue 302. In some examples, to obtain one or more job instances, the storage nodes scans the job queue 302 for job instances that have been scheduled and whose start times have passed. In some examples, the jobs are allocated to the storage nodes 385 in shards in accordance with a sharding configuration. Sharding may refer to how jobs are distributed amongst the storage nodes in the data management cluster. In some examples, sets of jobs are allocated to sets of storage nodes in respective sharding groups based on the sharding configuration.

Based on the sharding configuration and the timing parameters, the storage nodes may load one or more respective job instances from the job queue 302 into a local job queue. In some examples, the storage nodes may execute the job instances in accordance with the start times of the job instances in the local job queue. As described herein, the job instances executed by the storage nodes may be resumable (e.g., if the job instances include one or more tasks that are retriable in the event of a failure) or non-resumable (e.g., if the tasks in the job instances are not retriable).

A storage node may fail to complete the tasks used to execute a loaded job instance. If the job is a non-resumable job, the storage node may schedule a new instance of the job and post the new instance of the job to the job queue 302. If the job is a resumable job, the storage node may schedule the same instance of the job and post the same instance of the job to the job queue 302. Based on a software version installed at the storage node, the storage node may generate the new job instance in accordance with the software version installed at the storage node. In some examples, the storage node includes, with the posted job instance, an indication of the software version used to generate the job instance. Similarly, if a storage node successfully completes a job instance, the storage node may schedule a subsequent instance of the job and post the subsequent instance of the job to the job queue 302 (along with an indication of the software version used to generate the new job instance). In some examples, the storage node indicates the software version associated with the job instance by updating a field in an entry of a job table corresponding to the job, an entry of the job table corresponding to the job instance, or both.

Accordingly, during a non-disruptive update procedure, if the storage node that scheduled the job instance uses an updated software version, storage nodes using a prior software version may refrain from loading the new job instance from the job queue 302—e.g., if forward compatibility is not maintained between the software versions for the job. Alternatively, if the storage node uses the prior software version, any of the storage nodes (including updated storage nodes) may load the new job instance from the job queue 302—e.g., if backward compatibility is maintained between the software versions for the job. That said, if an updated storage node loads a job instance scheduled by the nonupdated storage node and schedules a new instance of the job, then storage nodes using a prior software version may refrain from loading the new instance of the job (even though the original instance was generated by a nonupdated storage node).

At 307, one or more threads that support the update procedure at the storage nodes may be generated—e.g., based on a rolling update procedure being initiated. In some examples, the driving storage node generates and manages the threads. In some examples, to support overlapping the installation process of an update at one storage node (e.g., the first storage node 385-1) with the quiescent period of another storage node (e.g., the second storage node 385-2), multiple update threads may be generated to support separate update procedures at separate storage nodes. For example, a thread may be generated for each storage node. Each thread may be configured with multiple checkpoints that indicate a progress of the update procedure for a respective storage node. By configuring threads for each storage node, the operations of the threads of an indefinite quantity of storage nodes may be overlapped with one another. Also, overlap relationships between the operations of different storage nodes may be flexibly designated—e.g., the first operations of a first storage node may be configured to overlap with second operations of a second storage node and third operations of a third storage node.

The checkpoints may include a first set of checkpoints (which may be referred to as Si to SA) associated with a portion of the update procedure where the storage node remains functional (e.g., through a prechecking procedure, quiesce procedure, etc.) and capable of supporting a service provided by the data management cluster. The checkpoints may also include a second set of checkpoints (which may be referred to as SB to SN) associated with a portion of the update procedure where the storage node is down. In some examples, the operations associated with the second set of checkpoints and performed at a first storage node (e.g., the first storage node 385-1) may be overlapped with the operations associated with the first set of checkpoints and performed at one or more other storage nodes (e.g., including the second storage node 385-2). In some cases, the quantity of storage nodes included in the one or more storage nodes is based at least in part on a quantity of storage nodes in the data management cluster that can be down at one time.

By overlapping update operations of one storage node with update operations of another storage node, a duration for updating the cluster of storage nodes may be reduced. For example, if x is the quantity of storage nodes in the data management cluster that can be down at one time, n is the quantity of storage nodes in the data management cluster, a is the time to complete the first set of operations associated with the first set of checkpoints, and b is the time to complete the second set of operations associated with the second set of checkpoints, then (without overlapping) a duration of the update procedure may be calculated as $$(a+b)\left(\frac{n}{x}\right).$$

By contrast, with overlapping, a duration of the update procedure may be calculated as $$(b)\left(\frac{n}{x}\right) + a.$$

In some examples, the threads may also be used to keep track of a progress of the update procedure and to resume the update procedure from an intermediate and stable location in the event the update procedure is inadvertently restarted. For example, storage location (e.g., a non-volatile storage location at the data management cluster or at another location) may be updated with the current checkpoint reached by each thread. Accordingly, if the update procedure is restarted, the storage location may be accessed to determine the checkpoints reached by each thread during the previously attempted update procedure, and the update procedure may be resumed from those checkpoints. Aspects for supporting the threading operation are described in more detail herein and with reference to FIG. 4.

In some examples, whether overlapping the update operations of multiple storage nodes is enabled is based on a quantity of storage nodes in the data management cluster. For example, the overlapping capability may be configurable for data management clusters having eight or more storage nodes, where at least two storage nodes may be down simultaneously.

In some examples, based on generating the threads, a plan for updating the storage nodes 385 may be determined (e.g., an update order, overlapping relationships, a quiesce duration, etc.). In some cases, the update order may be based on a sequence of sharding assignments for the storage nodes. For example, the update sequence may be configured to sequentially update storage nodes in a sharding group to increase a likelihood that updated storage nodes are available to pick up jobs posted by other updated storage nodes in the sharding group. Based on determining the plan for updating the storage nodes 385, a rolling update procedure may begin—e.g., starting with the first storage node 385-1.

At 310, the first storage node 385-1 may initiate a procedure to install an updated version at the first storage node 385-1. In some examples, as part of initiating the procedure, a state machine may be instantiated for the first storage node 385-1, where the state machine may begin in a preparing state (e.g., the preparing state 225 of FIG. 2). In some examples, a thread of the one or more threads may be used to support and keep track of the progress of the installation of the update software version at the first storage node 385-1.

At 315, while in the preparing state and before installing the updated version, the first storage node 385-1 may enter a quiescent state, which may be a substrate of the preparing state. While in the quiescent state, the first storage node 385-1 may refrain from obtaining jobs from the job queue 302—e.g., may stop scanning the job queue. Also, the first storage node 385-1 may continue to execute jobs at the first storage node 385-1 that are in progress. The first storage node 385-1 may remain in the quiescent state for a quiesce period, which may extend for minutes (e.g., 5 minutes to an hour).

While in the quiescent state, a status of the first storage node 385-1 may be set to OK-quiesce to indicate, to services provided by the data management cluster, that the first storage node 385-1 is still supporting the services. The OK-quiesce state may also indicate to a job fetcher at the first storage node 385-1 that an update is impending (e.g., so the job fetcher knows not to load additional job instances from the job queue 302, to load only certain types of job instances from the job queue 302, or the like).

Based on entering the quiescent state, the first storage node 385-1 may establish a first local job queue for jobs at the first storage node 385-1 that have not yet been started and a second local job queue for jobs at the first storage node 385-1 that are in progress. The first storage node 385-1 may refrain from starting jobs in the first local job queue that have not started but may continue to execute the jobs in the second job queue that are in progress. In some examples, the first storage node 385-1 may continue to initiate jobs in the first local job queue (but only after determining that the job can be completed within the quiesce period or that the job is resumable). The first storage node 385-1 may also include a clean-up job queue used to clean up after completed or failed jobs. The first storage node 385-1 may continue to perform the clean-up jobs in the clean-up job queue during the quiesce period.

In some examples, the first storage node 385-1 may exit the quiescent state early. For example, the first storage node 385-1 may exit the quiescent state early if all of the job instances at the first storage node 385-1 are completed prior to the end of the quiesce period. In another example, the first storage node 385-1 may exit the quiescent state early if the first storage node 385-1 enters an error state that interrupts all of the active jobs during the quiescent period—e.g., after the error is resolved.

In some examples, the first storage node 385-1 is unable to complete the instance of a job within the quiesce period. In such cases, the job instance may fail. Before proceeding with the installation of the update, the first storage node 385-1 may post the failed job instances to the job queue 302. For resumable jobs, the first storage node 385-1 may schedule the same job instance and indicate a checkpoint reached by the job instance during the quiesce period. Thus, the quiesce period may enable resumable jobs to reach checkpoints, saving the progress of the resumable jobs, even if the resumable jobs are unable to finish. For non-resumable jobs, the first storage node 385-1 may schedule a new instance of the job to the job queue 302. In some examples, the first storage node 385-1 may also post clean-up job instances for cleaning up invalid information generated by the failed job instances during execution. Additionally, or alternatively, other storage nodes may detect the job instances that failed, and may schedule new instances of the failed jobs, clean up jobs for the failed job instances, or both.

Other storage nodes of the storage nodes 385 may pick up the newly scheduled job instances from the job queue 302—e.g., after ensuring that the software version associated with the job predates or matches the software version installed at the storage node picking up the job instance. For resumable jobs, the storage node that picks up the job instance may resume execution of the job instance from the checkpoint reached by the first storage node 385-1.

In some examples, the first storage node 385-1 may determine that a failed job instance is associated with a last retry attempt of the job. During normal operation, the first storage node 385-1 may refrain from scheduling a new instance of the job based on the last retry attempt failing, and a notification that the job has failed may be provided to a customer (e.g., via a user interface). During a non-disruptive update operation, however, the first storage node 385-1 may reschedule a new instance of the job (or a same instance of a resumable job) based on determining that the failure was due to updating the first storage node 385-1, rather than with an internal failure with the execution of the job. In some examples, if a system parameter for indicating an update is in progress is set to True, then, during a clean-up procedure for the job, the job fetcher may determine that the job instance failed during an update and enable the job to be retried an additional time—e.g., by increasing the retry limit for the job for that set of job instances.

At 320, the first storage node 385-1 may load, while in the quiescent state, one or more job instances from the job queue 302 based on determining that the jobs may be completed within the quiesce period. In some examples, the jobs are clean-up jobs, such as garbage collection, data deletion, etc.

At 325, the first storage node 385-1 may reschedule new job instances (e.g., for non-resumable jobs) or the same job instances (e.g., for resumable jobs)—e.g., by creating the job instances and posting the to the job queue 302. The first storage node 385-1 may also schedule job instances for cleaning up the failed job instances. As described herein, for a non-resumable job, the first storage node 385-1 may reschedule a new instance of a non-resumable job even if the failed instance of the non-resumable job was associated with a last retry attempt for the non-resumable job. As also described herein, the first storage node 385-1 may reschedule the same instance of a resumable job even if the failed task of the resumable job was associated with a last retry attempt. As additionally described herein, other storage nodes may detect the failure of the job instances at the first storage node 385-1 and post clean-up jobs, rescheduled job instances, or both to the job queue 302.

At 330, the first storage node 385-1 may begin installation of the update version. Prior to or at the beginning of installation, the first storage node 385-1 may terminate any jobs currently being performed. In some examples, the first storage node 385-1 may terminate all processes being performed at the first storage node 385-1 and perform a quick restart. In some cases, the first storage node 385-1 reschedules and posts the failed jobs (described with reference to 325) to the job queue 302 after the jobs are terminated but before the first storage node 385-1 performs the quick restart. In some examples, one or more jobs in the local job queue for uninitiated jobs of the first storage node 385-1 may be "stolen" by other storage nodes while the first storage node 385-1 is being updated.

At 335, one or more storage nodes of the other storage nodes 385 (e.g., second storage node 385-2) may enter the quiescent state while the first storage node 385-1 performs the installation process. As described herein, the one or more other storage nodes may refrain from obtaining new job instances and continue to execute ongoing job instances while in the quiescent state. Also, a status of the one or more other storage nodes may be set to OK-quiesce. In some examples, the one or more other storage nodes may enter the quiesce state based on the first storage node 385-1 entering a configuring state (e.g., the configuring state 230 of FIG. 2). In some examples, a storage node of the one or more other storage nodes (e.g., the second storage node 385-2) may enter the quiesce state when the first storage node 385-1 enters the configuring state, and another storage node of the one or more storage nodes may enter the quiesce state when the first storage node 385-1 enters a migrating state (e.g., the migrating state 235 of FIG. 2). The one or more other storage nodes may remain in the quiesce state until confirmation is received that the first storage node 385-1 successfully completed the update.

As described herein, in some examples, a next storage node (e.g., the second storage node 385-2) to be updated may not enter the quiescent state until after the first storage node 385-1 has successfully completed the update—and the storage nodes 385 may be updated serially. That said, by overlapping the installation of the first storage node 385-1 with the quiesce period of one or more other storage nodes (as described with reference to the operations performed at 335), the benefits of the quiesce period may be obtained across the storage nodes 385 with a reduced latency than if the quiesce period of a next storage node followed the completion of an update for a preceding storage node. In some examples, a duration of a quiescent state may be increased if the installation of an update at the first storage node 385-1 is overlapped with the quiescent state of multiple other storage nodes—e.g., which may enable the quiesce duration to be increased with reduced impact on the duration of the rolling update.

At 340, the first storage node 385-1 may perform a full restart—e.g., based on completing the update. If the update was completed successfully, the status of the first storage node 385-1 may be set to OK. If the update failed, the status of the first storage node 385-1 may be set to BAD, and the update procedure may be paused until the error that cause the update to fail at the first storage node 385-1 is resolved.

At 345, the second storage node 385-2 may begin installation of the update version, as similarly described with reference to the operations performed at 330. In some examples, one or more other nodes may enter a quiescent state based on the second storage node 385-2 beginning the installation. And so on.

Figure 4:
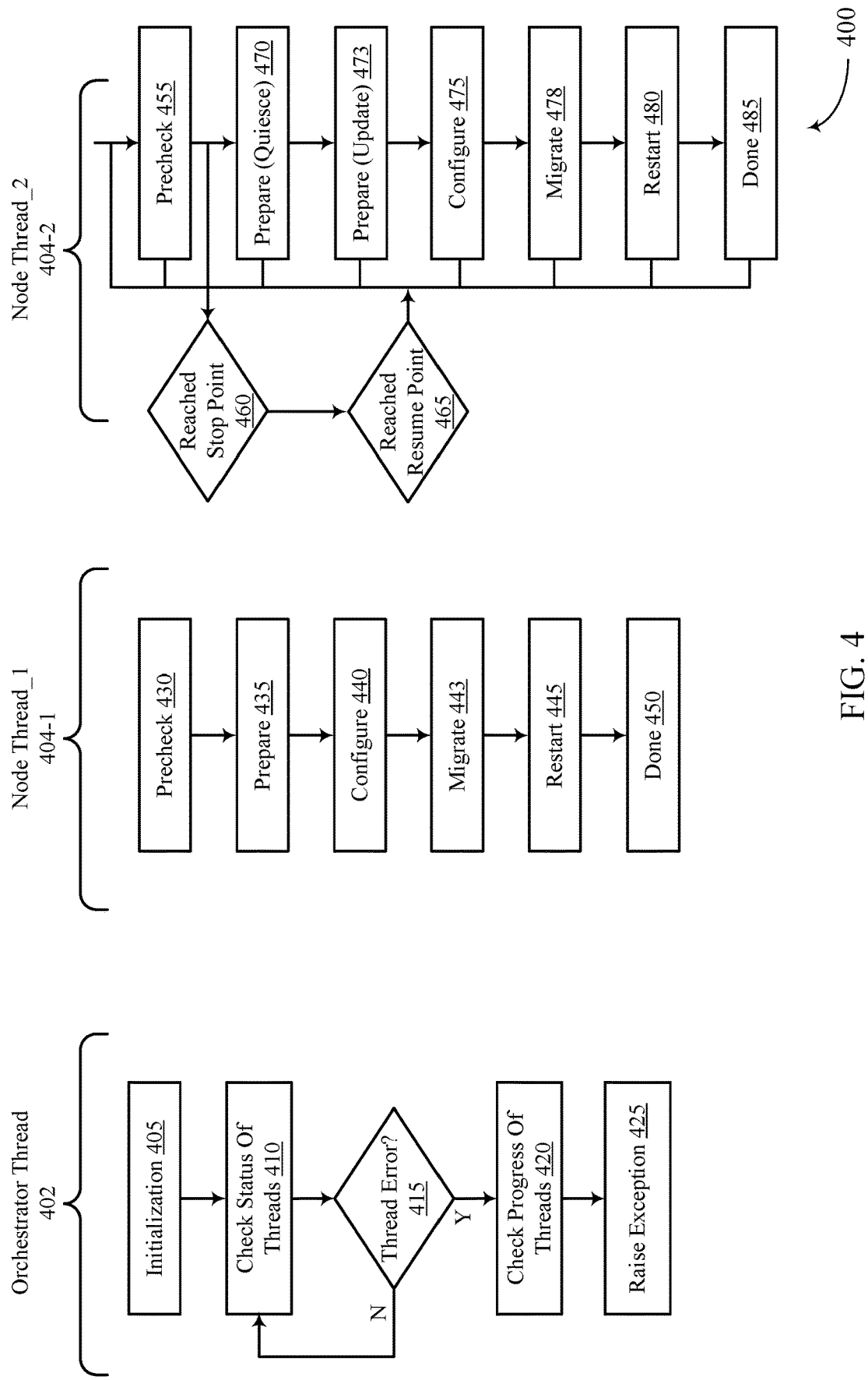
FIG. 4 shows an example of a set of operations for quiescent operation of non-disruptive update of a data management system in accordance with examples as disclosed herein.

FIG. 4 shows an example of a set of operations for quiescent operation of non-disruptive update of a data management system in accordance with examples as disclosed herein.

The flowcharts 400 may be performed by a driving storage node, which may be respective examples of the storage nodes described herein. In some examples, the flowcharts 400 shows an example set of operations performed to support quiescent operation of non-disruptive update of a data management system. For example, the flowcharts 400 may include operations for managing the threads used to support an update procedure.

Aspects of the flowcharts 400 may be implemented by a controller, among other components. Additionally, or alternatively, aspects of the flowcharts 400 may be implemented as instructions stored in memory (e.g., firmware stored in a memory coupled with a controller). For example, the instructions, when executed by a controller, may cause the controller to perform the operations of the flowcharts 400.

The flowcharts 400 may depict a set of operations for an orchestrator thread 402, a set of operations for a first node thread 404-1, and a set of operations for a second node thread 404-2. The orchestrator thread 402 may be used to orchestrate a rolling update procedure and may manage the operation of the node threads 404. The node threads 404 may be used to control a progress of an update procedure for a storage node, where the first node thread 404-1 may be used to control an update of a first storage node, and the second node thread 404-2 may be used to control an update of a second storage node. Additional node threads may be configured for additional storage nodes. In some examples, the orchestrator thread 402 and the node threads 404 may be executed at the driving storage node. The orchestrator thread 402 may run continuously throughout the rolling update and independent of the node threads 404.

At 405, the orchestrator thread 402 may be initialized. As part of the initialization a plan for updating the storage nodes (e.g., an update order, overlap relationships, quiesce durations, etc.) may be determined. Additionally, the node threads 404 may be established. In some examples, the node threads 404 include instructions indicating a relationship between the operation of different storage nodes. For example, the second node thread 404-2 may include the following instructions.

```
[
  {
    stop_at: {state: RuPrechecking, task: 0, position: start}
    resume_when: {node: 1, state: RuConfiguring, task: 0, position: start}
  }
  {
    stop_at: {state: RuPreparing, task: 3, position: start}
    resume_when: {node: 1, state: RuDone, task: 0, position: start}
  }
]
```

After creating the node threads 404, the threads may begin executing respective tasks, and the rolling update procedure may begin.

At 410, the orchestrator thread 402 may check the status of the threads to determine whether any of the threads has encountered an error.

At 415, if none of the node threads 404 has encountered an error, the orchestrator thread 402 may again check the status of the node threads 404 for errors after waiting for a duration (e.g., 30 seconds). Otherwise, if one or more of the node threads 404 has encountered an error the orchestrator thread 402 may proceed to perform the operations at 420.

At 420, the orchestrator thread 402 may check the progress of all of the node threads 404 to determine whether each of the node threads 404 has reached a stable point of operations—e.g., a done state, an error state, a wait point, etc.

At 425, the orchestrator thread 402 may raise an exception that pauses (or stops) the rolling update procedure based on determining that each of the node threads 404 has reached a stable point of operation.

At 430, the first node thread 404-1 may execute the tasks for checking whether the first storage node is prepared for update. At 435, the first node thread 404-1 may execute the tasks for preparing the first storage node for update (which may include observing a quiesce period). At 440, the first node thread 404-1 may execute the tasks for configuring new system configurations at the first storage node. At 443, the first node thread 404-1 may execute the tasks for initializing and migrating data from the first system configurations to the new system configurations. At 445, the first node thread 404-1 may execute the tasks for restarting the first storage node. And, at 450, the first node thread 404-1 may enter a done state.

Throughout the rolling update procedure, the first node thread 404-1 may update a central status for the storage node. For example, after completing the configuring operations, the first node thread 404-1 may update the central status to indicate that the first node thread 404-1 is in a migrating state.

At 435, the second node thread 404-2 may execute the tasks for checking whether the second storage node is prepared for update. At 470, the second node thread 404-2 may execute the tasks for quiescing the second storage node. At 473, the second node thread 404-2 may execute the tasks for preparing the second storage node (e.g., stopping all jobs). At 475, the second node thread 404-2 may execute the tasks for configuring new system configurations at the second storage node. At 478, the second node thread 404-2 may execute the tasks for initializing and migrating data from the first system configurations to the new system configurations. At 480, the second node thread 404-2 may execute the tasks for restarting the second storage node. And, at 485, the second node thread 404-2 may enter a done state.

After and/or while performing the operations of each block, the second node thread 404-2 may determine whether the second node thread has reached a stopping point—e.g., based on the instructions included in the second node thread 404-2. For example, based on the instructions, before performing the prechecking operations described at 455, the second node thread 404-2 may reach a stopping point and proceed to 460. While at 460, the second node thread 404-2 may enter a waiting state.

Based on the first node thread 404-1 starting the configuring operations described at 440, the second node thread 404-2 may determine that a resume point has been reached and proceed to 465. Based on proceeding to 465, the second node thread 404-2 may determine the next operations to perform based on the instruction and begin the prechecking operations described at 455. Based on completing the prechecking operations described at 455, the second node thread 404-2 may proceed to perform the quiescing operations described at 470.

Based on completing the quiescing operations, the second node thread 404-2 may proceed to 473 and may perform a quantity of tasks. Based on the instructions, the second node thread 404-2 may identify another stopping point (e.g., at the start of a third task at 473) and return to 460.

Based on the first node thread 404-1 entering the done state, the second node thread 404-2 may determine that a resume point has been reached and return to 473 (e.g., to perform the third task at 473).

Throughout the rolling update procedure, the second node thread 404-2 may update a central status for the storage node. For example, after reaching a stop point, the second node thread 404-2 may update the central status to indicate that the second node thread 404-2 is in a waiting state as well as the state the second node thread 404-2 was in prior to entering the waiting state. In another example, after entering the done state, the second node thread 404-2 may update the central status to indicate that the second node thread 404-2 is in the done state.

Figure 5:
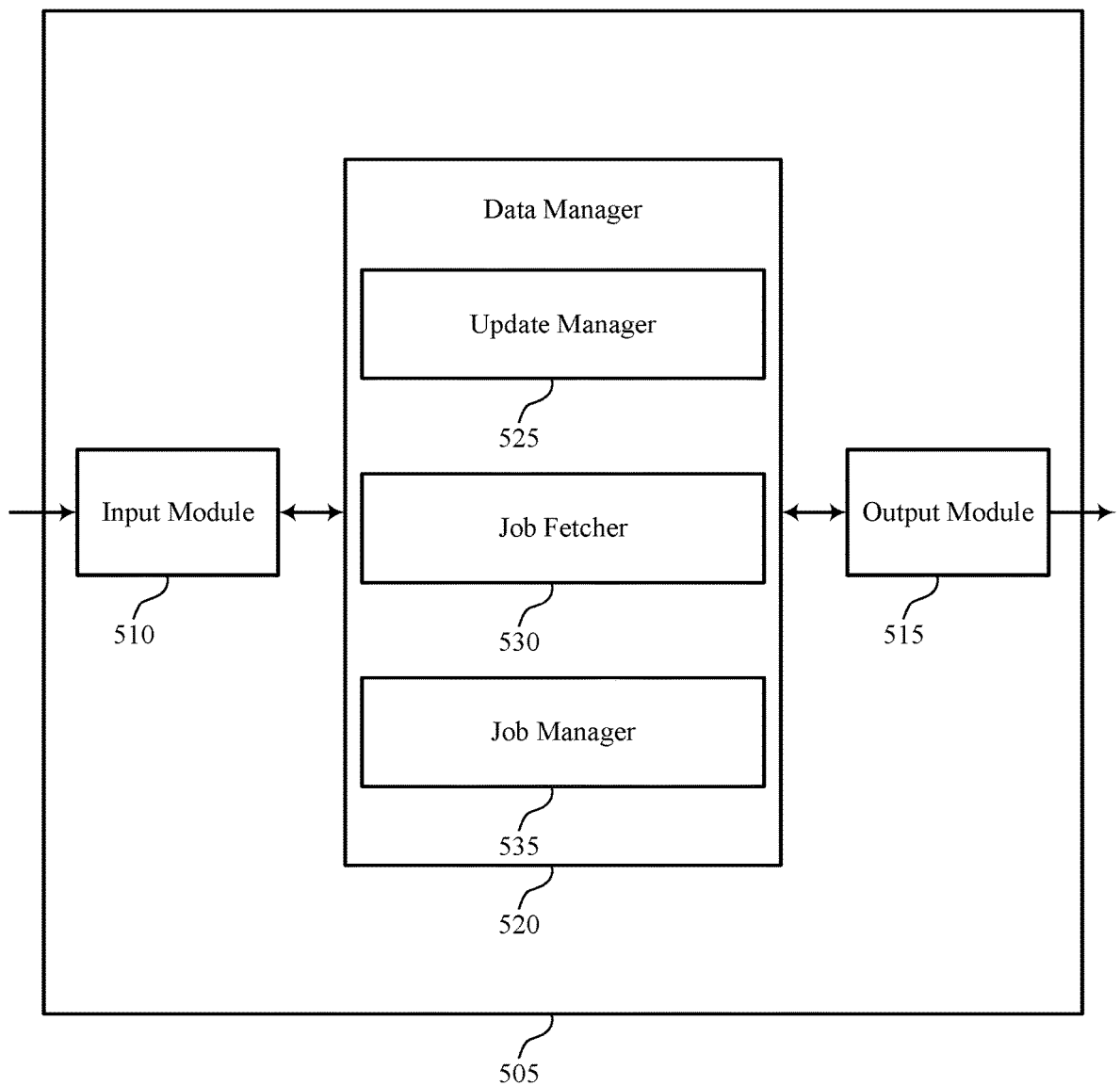
FIG. 5 shows a block diagram of an apparatus that supports quiescent operation of non-disruptive update of a data management system in accordance with aspects of the present disclosure.

FIG. 5 shows a block diagram 500 of a system 505 that supports quiescent operation of non-disruptive update of a data management system in accordance with aspects of the present disclosure. In some examples, the system 505 may be an example of aspects of one or more components described with reference to FIG. 1, such as a DMS 110 or a storage node 185. The system 505 may include an input interface 510, an output interface 515, and a data manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the data manager 520 to support quiescent operation of non-disruptive update of a data management system. In some cases, the input interface 510 may be a component of a network interface 715 as described with reference to FIG. 7.

The output interface 515 may manage output signaling for the system 505. For example, the output interface 515 may receive signaling from other components of the system 505, such as the data manager 520, and may transmit such output signaling corresponding to (e.g., representative of or otherwise based on) such signaling to other systems or devices. In some cases, the output interface 515 may be a component of a network interface 715 as described with reference to FIG. 7.

The data manager 520 may include an update manager 525, a job fetcher 530, a job manager 535, or any combination thereof, or any combination thereof. In some examples, the data manager 520, or various components thereof, may be configured to perform various operations (e.g., receiving, monitoring, transmitting) using or otherwise in cooperation with the input interface 510, the output interface 515, or both. For example, the data manager 520 may receive information from the input interface 510, send information to the output interface 515, or be integrated in combination with the input interface 510, the output interface 515, or both to receive information, transmit information, or perform various other operations as described herein.

The update manager 525 may be configured as or otherwise support a means for entering, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes. The job fetcher 530 may be configured as or otherwise support a means for refraining, by the storage node while in the quiescent state, from obtaining new jobs. The job manager 535 may be configured as or otherwise support a means for continuing, by the storage node while in the quiescent state, to execute one or more jobs initiated at the storage node prior to entering the quiescent state.

Figure 6:
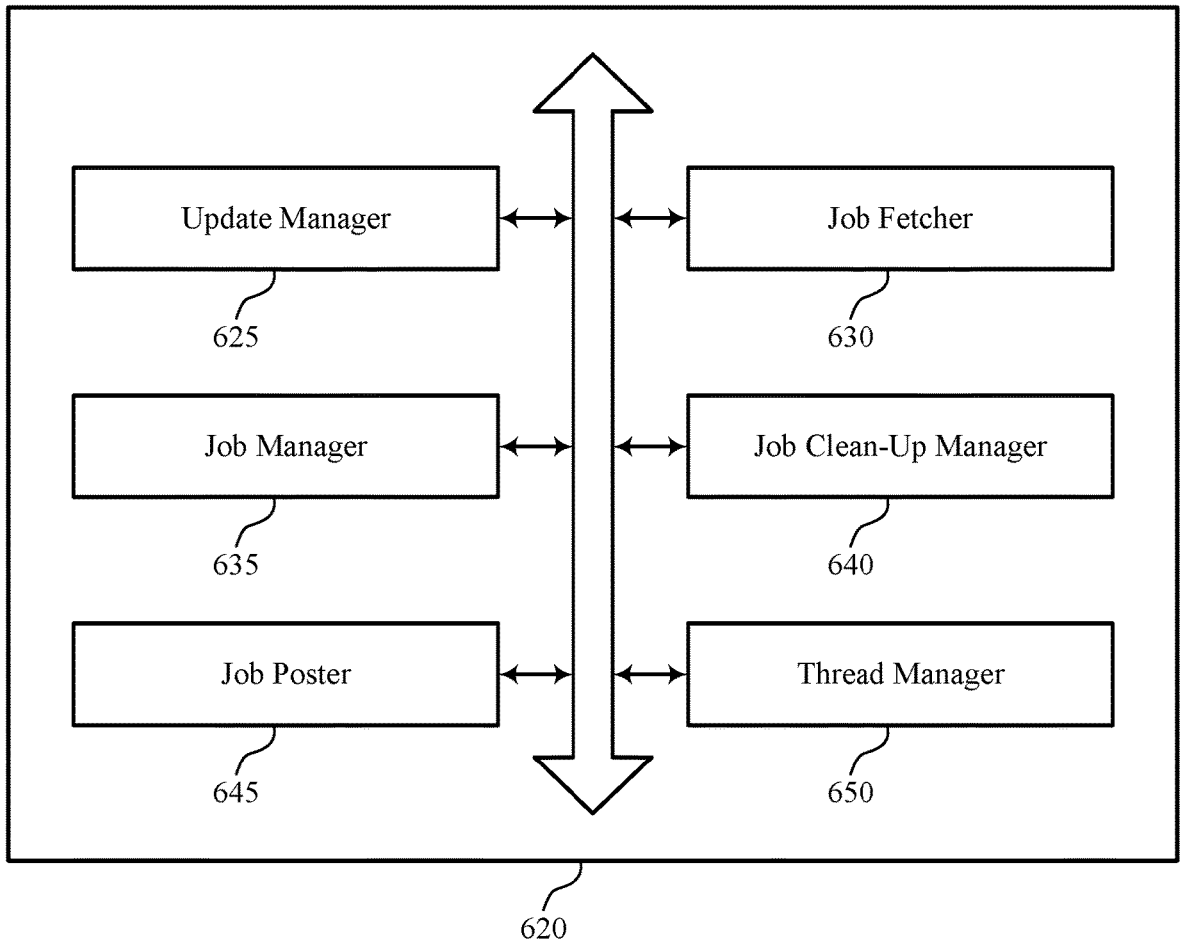
FIG. 6 shows a block diagram of a storage manager that supports quiescent operation of non-disruptive update of a data management system in accordance with aspects of the present disclosure.

FIG. 6 shows a block diagram 600 of a data manager 620 that supports quiescent operation of non-disruptive update of a data management system in accordance with aspects of the present disclosure. The data manager 620 may be an example of or include aspects of a data manager 520 as described herein. The data manager 620, or various components thereof, may be an example of means for performing various aspects of techniques for quiescent operation of non-disruptive update of a data management system as described herein. For example, the data manager 620 may include an update manager 625, a job fetcher 630, a job manager 635, a job clean-up manager 640, a job poster 645, a thread manager 650, or any combination thereof. Each of these components may communicate, directly or indirectly, with one another (e.g., via one or more buses, communications links, communications interfaces, or any combination thereof).

The update manager 625 may be configured as or otherwise support a means for entering, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes. The job fetcher 630 may be configured as or otherwise support a means for refraining, by the storage node while in the quiescent state, from obtaining new jobs. The job manager 635 may be configured as or otherwise support a means for continuing, by the storage node while in the quiescent state, to execute one or more jobs initiated at the storage node prior to entering the quiescent state.

In some examples, the job manager 635 may be configured as or otherwise support a means for completing, by the storage node, at least a subset of the one or more jobs prior to an end of a quiescent period of the storage node.

In some examples, the job manager 635 may be configured as or otherwise support a means for determining that all of the one or more jobs have completed prior to an end of a quiescent period of the storage node. In some examples, the job clean-up manager 640 may be configured as or otherwise support a means for deleting, by the storage node, temporary data, obsolete data, or both, for all of the one or more jobs. In some examples, the update manager 625 may be configured as or otherwise support a means for exiting, by the storage node, the quiescent state prior to the end of the quiescent period based on all of the one or more jobs completing prior to the end of the quiescent period of the storage node.

In some examples, the job manager 635 may be configured as or otherwise support a means for configuring, by the storage node, a first job queue for storing a first set of jobs obtained by the storage node but not initiated prior to entering the quiescent state. In some examples, the job manager 635 may be configured as or otherwise support a means for configuring, by the storage node, a second job queue for storing the one or more jobs initiated at the storage node prior to entering the quiescent state. In some examples, the job manager 635 may be configured as or otherwise support a means for refraining from initiating the first set of jobs from the first job queue while in the quiescent state.

In some examples, the update manager 625 may be configured as or otherwise support a means for exiting, by the storage node, the quiescent state at an end of a quiescent period. In some examples, the job manager 635 may be configured as or otherwise support a means for terminating, by the storage node, an instance of a job included in the one or more jobs that is ongoing at the end of the quiescent period, where the job is a resumable job. In some examples, the job poster 645 may be configured as or otherwise support a means for posting, by the storage node, the instance of the job to a job queue.

In some examples, the instance of the job posted from the job queue is obtained by a second storage node of the cluster of storage nodes. In some examples, an execution of the instance of the job is resumed from a checkpoint reached for the job by the storage node during the quiescent period by the second storage node.

In some examples, the instance of the job posted by the storage node includes an indication of a software version installed on the storage node.

In some examples, the job manager 635 may be configured as or otherwise support a means for exiting, by the storage node, the quiescent state at an end of a quiescent period. In some examples, the job manager 635 may be configured as or otherwise support a means for terminating, by the storage node, an instance of a job included in the one or more jobs at the end of the quiescent period, where the job is a non-resumable job. In some examples, the job clean-up manager 640 may be configured as or otherwise support a means for deleting, by the storage node, temporary data, obsolete data, or both for the instance of the job. In some examples, the job poster 645 may be configured as or otherwise support a means for posting, by the storage node, a second instance of the job to a job queue.

In some examples, the second instance of the job posted to the job queue is obtained by a second storage node of the cluster of storage nodes. In some examples, an execution of the second instance of the job is resumed from a beginning of a.

In some examples, the job manager 635 may be configured as or otherwise support a means for determining, by the storage node based on the instance of the job being terminated, that the job has been retried a threshold quantity of times. In some examples, the job manager 635 may be configured as or otherwise support a means for determining, by the storage node, that the instance of the job is terminated during the update procedure, where the second instance of the job is posted to the job queue despite the job having been retried the threshold quantity of times based on the job being terminated during the update procedure.

In some examples, the job fetcher 630 may be configured as or otherwise support a means for identifying, by the storage node while the first version is installed on the storage node, an instance of a new job in a job queue for execution at the storage node. In some examples, the job fetcher 630 may be configured as or otherwise support a means for determining, by the storage node, that the instance of the new job was generated by a second storage node that uses the second version. In some examples, the job fetcher 630 may be configured as or otherwise support a means for refraining from obtaining the new job based on determining that the instance of the new job was generated using the second version.

In some examples, refraining from obtaining new jobs comprises refraining from obtaining new jobs that are unable to be completed within a quiescent period corresponding to a duration of the quiescent state at the storage node, and the job fetcher 630 may be configured as or otherwise support a means for obtaining new jobs that are able to be completed within the quiescent period of the storage node.

In some examples, the storage node enters the quiescent state while a second storage node of the cluster of storage nodes is in an update state for installing the second version on the second storage node based on the update procedure.

In some examples, the thread manager 650 may be configured as or otherwise support a means for generating a set of multiple threads for updating the cluster of storage nodes, where each thread of the set of multiple threads is for updating a respective storage node of the cluster of storage nodes, and where each thread includes a set of multiple checkpoints associated with updating the respective storage node.

In some examples, a second thread of the set of multiple threads for a second storage node reaches a checkpoint associated with installing the second version on the second storage node; and a first thread of the set of multiple threads for the storage node begins executing tasks associated with the quiescent state based on the second thread reaching the checkpoint.

In some examples, the thread manager 650 may be configured as or otherwise support a means for storing a respective progress for each thread of the set of multiple threads, where the update procedure is paused or restarted at a point during execution of the update procedure. In some examples, the update manager 625 may be configured as or otherwise support a means for resuming, based on the respective progress stored for each thread, the update procedure from the point at which the update procedure is paused or restarted.

Figure 7:
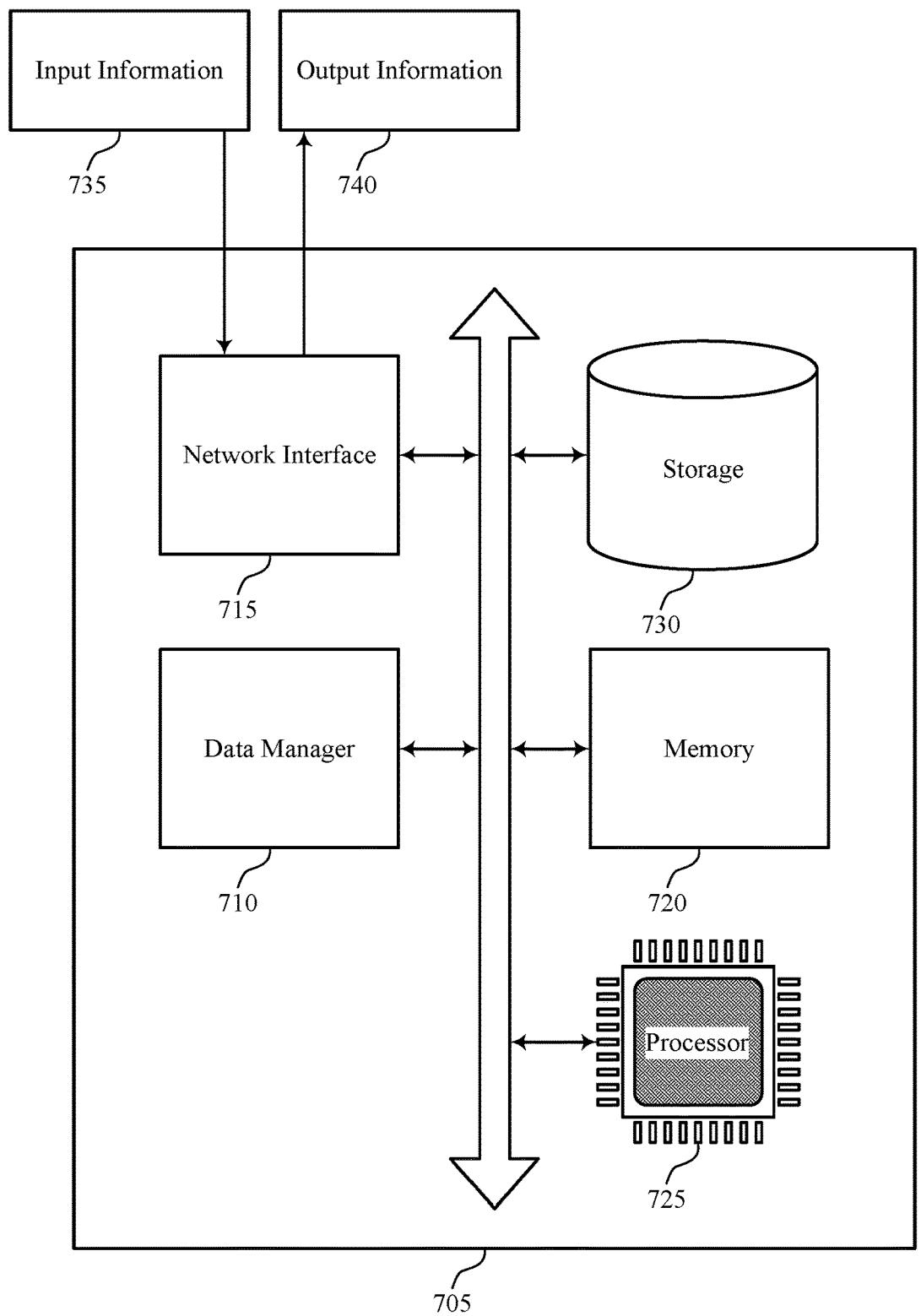
FIG. 7 shows a block diagram of a system including a device that supports quiescent operation of non-disruptive update of a data management system in accordance with aspects of the present disclosure.

FIG. 7 shows a block diagram 700 of a system 705 that supports quiescent operation of non-disruptive update of a data management system in accordance with aspects of the present disclosure. The system 705 may be an example of or include aspects of a system 505 as described herein. The system 705 may include components for data management, including components such as a data manager 710, a network interface 715, memory 720, processor 725, and storage 730. These components may be in electronic communication or otherwise coupled with each other (e.g., operatively, communicatively, functionally, electronically, electrically; via one or more buses, communications links, communications interfaces, or any combination thereof). Additionally, the components of the system 705 may comprise corresponding physical components or may be implemented as corresponding virtual components (e.g., components of one or more virtual machines). In some examples, the system 705 may be an example of aspects of one or more components described with reference to FIG. 1, such as a DMS 110 or a storage node 185.

The network interface 715 may enable the system 705 to exchange information (e.g., input information 735, output information 740, or both) with other systems or devices (not shown). For example, the network interface 715 may enable the system 705 to connect to a network (e.g., a network 120 as described herein). The network interface 715 may include one or more wireless network interfaces, one or more wired network interfaces, or any combination thereof. In some examples, the network interface 715 may be an example of may be an example of aspects of one or more components described with reference to FIG. 1, such as one or more network interfaces 165.

Memory 720 may include RAM, ROM, or both. The memory 720 may store computer-readable, computer-executable software including instructions that, when executed, cause the processor 725 to perform various functions described herein. In some cases, the memory 720 may contain, among other things, a basic input/output system (BIOS), which may control basic hardware or software operation such as the interaction with peripheral components or devices. In some cases, the memory 720 may be an example of aspects of one or more components described with reference to FIG. 1, such as one or more memories 175.

The processor 725 may include an intelligent hardware device, (e.g., a general-purpose processor, a digital signal processor (DSP), a CPU, a microcontroller, an application-specific integrated circuit (ASIC), a field programmable gate array (FPGA), a programmable logic device, a discrete gate or transistor logic component, a discrete hardware component, or any combination thereof). The processor 725 may be configured to execute computer-readable instructions stored in a memory 720 to perform various functions (e.g., functions or tasks supporting quiescent operation of non-disruptive update of a data management system). Though a single processor 725 is depicted in the example of FIG. 7, it is to be understood that the system 705 may include any quantity of one or more processors 725 and that a group of processors 725 may collectively perform one or more functions ascribed herein to a processor, such as the processor 725. In some cases, the processor 725 may be an example of aspects of one or more components described with reference to FIG. 1, such as one or more processors 170.

Storage 730 may be configured to store data that is generated, processed, stored, or otherwise used by the system 705. In some cases, the storage 730 may include one or more HDDs, one or more SDDs, or both. In some examples, the storage 730 may be an example of a single database, a distributed database, multiple distributed databases, a data store, a data lake, or an emergency backup database. In some examples, the storage 730 may be an example of one or more components described with reference to FIG. 1, such as one or more network disks 180.

The data manager 710 may be configured as or otherwise support a means for entering, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes. The data manager 710 may be configured as or otherwise support a means for refraining, by the storage node while in the quiescent state, from obtaining new jobs. The data manager 710 may be configured as or otherwise support a means for continuing, by the storage node while in the quiescent state, to execute one or more jobs initiated at the storage node prior to entering the quiescent state.

Figure 8:
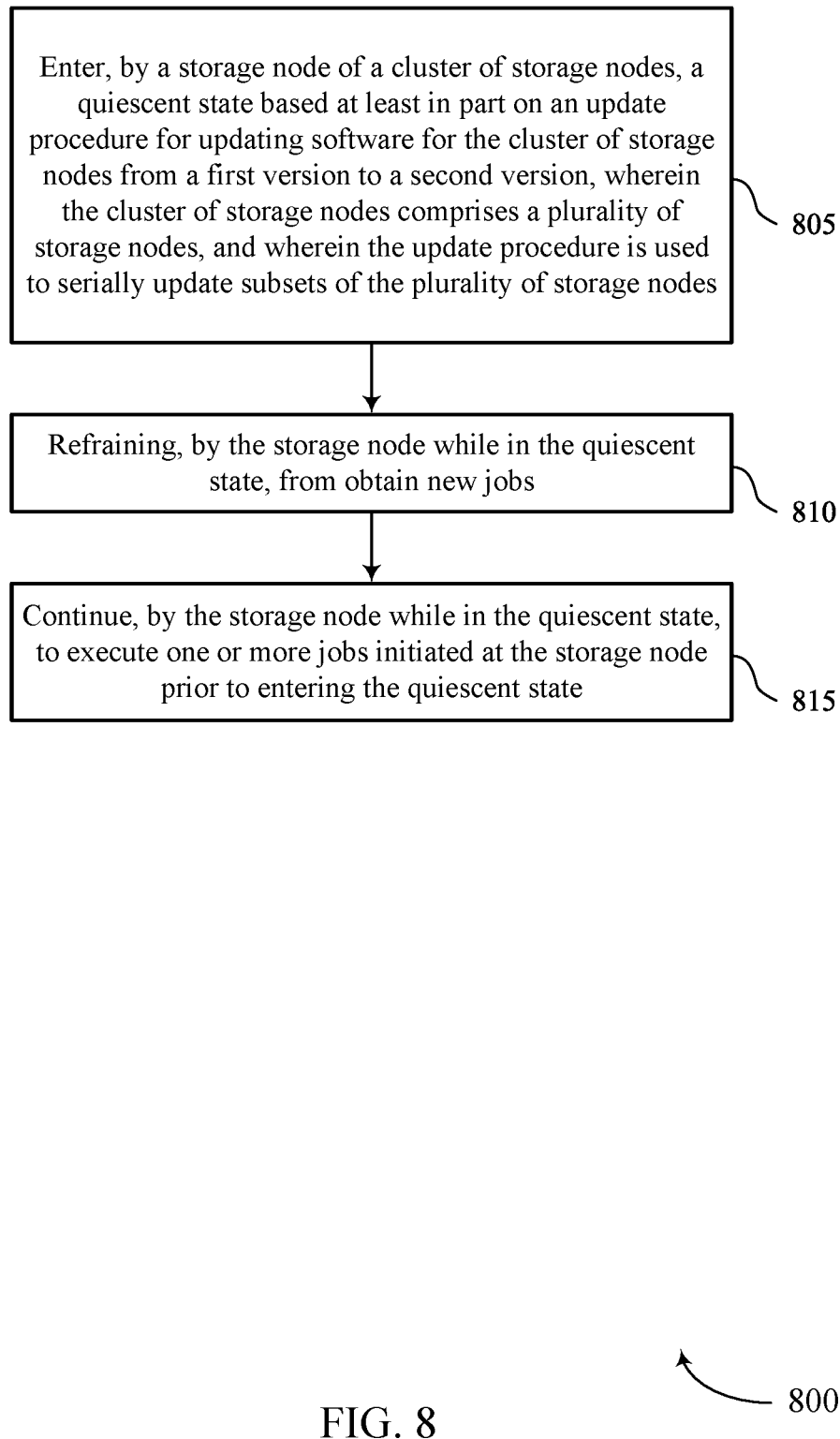
FIG. 8 shows a flowchart illustrating methods that support quiescent operation of non-disruptive update of a data management system in accordance with aspects of the present disclosure.

FIG. 8 shows a flowchart illustrating a method 800 that supports techniques for quiescent operation of non-disruptive update of a data management system in accordance with aspects of the present disclosure. The operations of the method 800 may be implemented by a system or its components as described herein. For example, the operations of the method 800 may be performed by a DMS or storage node as described with reference to FIGS. 1 through 7. In some examples, a DMS or storage node may execute a set of instructions to control the functional elements of the DMS or storage node to perform the described functions. Additionally, or alternatively, the DMS or storage node may perform aspects of the described functions using special-purpose hardware.

At 805, the method may include entering, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes. The operations of 805 may be performed in accordance with examples as disclosed herein. In some examples, aspects of the operations of 805 may be performed by an update manager 625 as described with reference to FIG. 6.

At 810, the method may include refraining, by the storage node while in the quiescent state, from obtaining new jobs. The operations of 810 may be performed in accordance with examples as disclosed herein. In some examples, aspects of the operations of 810 may be performed by a job fetcher 630 as described with reference to FIG. 6.

At 815, the method may include continuing, by the storage node while in the quiescent state, to execute one or more jobs initiated at the storage node prior to entering the quiescent state. The operations of 815 may be performed in accordance with examples as disclosed herein. In some examples, aspects of the operations of 815 may be performed by a job manager 635 as described with reference to FIG. 6.

A method is described. The method may include entering, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes, refraining, by the storage node while in the quiescent state, from obtaining new jobs, and continuing, by the storage node while in the quiescent state, to execute one or more jobs initiated at the storage node prior to entering the quiescent state.

An apparatus is described. The apparatus may include a processor, memory coupled with the processor, and instructions stored in the memory. The instructions may be executable by the processor to cause the apparatus to enter, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes, refraining, by the storage node while in the quiescent state, from obtain new jobs, and continue, by the storage node while in the quiescent state, to execute one or more jobs initiated at the storage node prior to entering the quiescent state.

Another apparatus is described. The apparatus may include means for entering, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes, means for refraining, by the storage node while in the quiescent state, from obtaining new jobs, and means for continuing, by the storage node while in the quiescent state, to execute one or more jobs initiated at the storage node prior to entering the quiescent state.

A non-transitory computer-readable medium storing code is described. The code may include instructions executable by a processor to enter, by a storage node of a cluster of storage nodes, a quiescent state based on an update procedure for updating software for the cluster of storage nodes from a first version to a second version, where the cluster of storage nodes includes a set of multiple storage nodes, and where the update procedure is used to serially update subsets of the set of multiple storage nodes, refraining, by the storage node while in the quiescent state, from obtain new jobs, and continue, by the storage node while in the quiescent state, to execute one or more jobs initiated at the storage node prior to entering the quiescent state.

Some examples of the method, apparatuses, and non-transitory computer-readable medium described herein may further include operations, features, means, or instructions for completing, by the storage node, at least a subset of the one or more jobs prior to an end of a quiescent period of the storage node.

Some examples of the method, apparatuses, and non-transitory computer-readable medium described herein may further include operations, features, means, or instructions for determining that all of the one or more jobs may have completed prior to an end of a quiescent period of the storage node, deleting, by the storage node, temporary data, obsolete data, or both, for all of the one or more jobs, and exiting, by the storage node, the quiescent state prior to the end of the quiescent period based on all of the one or more jobs completing prior to the end of the quiescent period of the storage node.

Some examples of the method, apparatuses, and non-transitory computer-readable medium described herein may further include operations, features, means, or instructions for configuring, by the storage node, a first job queue for storing a first set of jobs obtained by the storage node but not initiated prior to entering the quiescent state, configuring, by the storage node, a second job queue for storing the one or more jobs initiated at the storage node prior to entering the quiescent state, and refraining from initiating the first set of jobs from the first job queue while in the quiescent state.

Some examples of the method, apparatuses, and non-transitory computer-readable medium described herein may further include operations, features, means, or instructions for exiting, by the storage node, the quiescent state at an end of a quiescent period, terminating, by the storage node, an instance of a job included in the one or more jobs that may be ongoing at the end of the quiescent period, where the job may be a resumable job, and posting, by the storage node, the instance of the job to a job queue.

In some examples of the method, apparatuses, and non-transitory computer-readable medium described herein, the instance of the job posted from the job queue may be obtained by a second storage node of the cluster of storage nodes and an execution of the instance of the job may be resumed from a checkpoint reached for the job by the storage node during the quiescent period by the second storage node.

In some examples of the method, apparatuses, and non-transitory computer-readable medium described herein, the instance of the job posted by the storage node includes an indication of a software version installed on the storage node.

Some examples of the method, apparatuses, and non-transitory computer-readable medium described herein may further include operations, features, means, or instructions for exiting, by the storage node, the quiescent state at an end of a quiescent period, terminating, by the storage node, an instance of a job included in the one or more jobs at the end of the quiescent period, where the job may be a non-resumable job, deleting, by the storage node, temporary data, obsolete data, or both for the instance of the job, and posting, by the storage node, a second instance of the job to a job queue.

In some examples of the method, apparatuses, and non-transitory computer-readable medium described herein, the second instance of the job posted to the job queue may be obtained by a second storage node of the cluster of storage nodes and an execution of the second instance of the job may be resumed from a beginning of a.

Some examples of the method, apparatuses, and non-transitory computer-readable medium described herein may further include operations, features, means, or instructions for determining, by the storage node based on the instance of the job being terminated, that the job may have been retried a threshold quantity of times and determining, by the storage node, that the instance of the job may be terminated during the update procedure, where the second instance of the job may be posted to the job queue despite the job having been retried the threshold quantity of times based on the job being terminated during the update procedure.

Some examples of the method, apparatuses, and non-transitory computer-readable medium described herein may further include operations, features, means, or instructions for identifying, by the storage node while the first version may be installed on the storage node, an instance of a new job in a job queue for execution at the storage node, determining, by the storage node, that the instance of the new job was generated by a second storage node that uses the second version, and refraining from obtaining the new job based on determining that the instance of the new job was generated using the second version.

In some examples of the method, apparatuses, and non-transitory computer-readable medium described herein, refraining from obtaining new jobs comprises refraining from obtaining new jobs that are unable to be completed within a quiescent period corresponding to a duration of the quiescent state at the storage node, and the method, apparatuses, and non-transitory computer-readable medium may include further operations, features, means, or instructions for obtaining new jobs that may be able to be completed within the quiescent period of the storage node.

In some examples of the method, apparatuses, and non-transitory computer-readable medium described herein, the storage node enters the quiescent state while a second storage node of the cluster of storage nodes may be in an update state for installing the second version on the second storage node based on the update procedure.

Some examples of the method, apparatuses, and non-transitory computer-readable medium described herein may further include operations, features, means, or instructions for generating a set of multiple threads for updating the cluster of storage nodes, where each thread of the set of multiple threads may be for updating a respective storage node of the cluster of storage nodes, and where each thread includes a set of multiple checkpoints associated with updating the respective storage node.

In some examples of the method, apparatuses, and non-transitory computer-readable medium described herein, a second thread of the set of multiple threads for a second storage node reaches a checkpoint associated with installing the second version on the second storage node; and a first thread of the set of multiple threads for the storage node begins executing tasks associated with the quiescent state based on the second thread reaching the checkpoint.

Some examples of the method, apparatuses, and non-transitory computer-readable medium described herein may further include operations, features, means, or instructions for storing a respective progress for each thread of the set of multiple threads, where the update procedure may be paused or restarted at a point during execution of the update procedure and resuming, based on the respective progress stored for each thread, the update procedure from the point at which the update procedure may be paused or restarted.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:
1. A method, comprising:
   entering, by a storage node of a cluster of storage nodes, a quiescent state based at least in part on an update procedure for updating software for the cluster of storage nodes from a first version to a second version, wherein the cluster of storage nodes comprises a plurality of storage nodes, and wherein the update procedure is used to serially update subsets of the plurality of storage nodes;
   configuring, by the storage node, a first job queue for storing a first set of jobs that were obtained by the storage node but were not initiated prior to entering the quiescent state and a second job queue for storing one or more jobs that were initiated at the storage node prior to entering the quiescent state;
   refraining, by the storage node while in the quiescent state, from obtaining new jobs and from initiating the first set of jobs in the first job queue; and
   continuing, by the storage node while in the quiescent state, to execute the one or more jobs in the second job queue that were initiated at the storage node prior to entering the quiescent state.
2. The method of claim 1, further comprising:
   completing, by the storage node, at least a subset of the one or more jobs prior to an end of a quiescent period of the storage node.

3. The method of claim 1, further comprising:
determining that all of the one or more jobs have completed prior to an end of a quiescent period of the storage node;
deleting, by the storage node, temporary data, obsolete data, or both, for all of the one or more jobs; and
exiting, by the storage node, the quiescent state prior to the end of the quiescent period based at least in part on all of the one or more jobs completing prior to the end of the quiescent period of the storage node.

4. The method of claim 1, further comprising:
exiting, by the storage node, the quiescent state at an end of a quiescent period;
terminating, by the storage node, an instance of a job included in the one or more jobs that is ongoing at the end of the quiescent period, wherein the job is a resumable job; and
posting, by the storage node, the instance of the job to a job queue.

5. The method of claim 4, further comprising:
obtaining, by a second storage node of the cluster of storage nodes, the instance of the job from the job queue; and
resuming, by the second storage node, execution of the instance of the job from a checkpoint reached for the job by the storage node during the quiescent period.

6. The method of claim 4, wherein the instance of the job posted by the storage node comprises an indication of a software version installed on the storage node.

7. The method of claim 1, further comprising:
exiting, by the storage node, the quiescent state at an end of a quiescent period;
terminating, by the storage node, an instance of a job included in the one or more jobs at the end of the quiescent period, wherein the job is a non-resumable job;
deleting, by the storage node, temporary data, obsolete data, or both for the instance of the job; and
posting, by the storage node, a second instance of the job to a job queue.

8. The method of claim 7, further comprising:
obtaining, by a second storage node of the cluster of storage nodes, the second instance of the job from the job queue; and
initiating, by the second storage node, execution of the second instance of the job from a beginning of a procedure for executing the job.

9. The method of claim 7, further comprising:
determining, by the storage node based at least in part on the instance of the job being terminated, that the job has been retried a threshold quantity of times; and
determining, by the storage node, that the instance of the job is terminated during the update procedure, wherein the second instance of the job is posted to the job queue despite the job having been retried the threshold quantity of times based at least in part on the job being terminated during the update procedure.

10. The method of claim 1, further comprising:
identifying, by the storage node while the first version is installed on the storage node, an instance of a new job in a job queue for execution at the storage node;
determining, by the storage node, that the instance of the new job was generated by a second storage node that uses the second version; and
refraining from obtaining the new job based at least in part on determining that the instance of the new job was generated using the second version.

11. The method of claim 1, further comprising:
entering, by a second storage node of the cluster of storage nodes, an update state for installing the second version on the second storage node based at least in part on the update procedure, wherein the storage node enters the quiescent state while the second storage node is in the update state.

12. The method of claim 1, further comprising:
generating a plurality of threads for updating the cluster of storage nodes, wherein each thread of the plurality of threads is for updating a respective storage node of the cluster of storage nodes, and wherein each thread comprises a plurality of checkpoints associated with updating the respective storage node.

13. The method of claim 12, wherein:
a second thread of the plurality of threads for a second storage node reaches a checkpoint associated with installing the second version on the second storage node; and
a first thread of the plurality of threads for the storage node begins executing tasks associated with the quiescent state based at least in part on the second thread reaching the checkpoint.

14. The method of claim 12, further comprising:
storing a respective progress for each thread of the plurality of threads, wherein the update procedure is paused or restarted at a point during execution of the update procedure; and
resuming, based at least in part on the respective progress stored for each thread, the update procedure from the point at which the update procedure is paused or restarted.

15. An apparatus, comprising:
a processor; and
a memory coupled with the processor, the memory storing instructions executable by the processor to cause the apparatus to:
enter, by a storage node of a cluster of storage nodes, a quiescent state based at least in part on an update procedure for updating software for the cluster of storage nodes from a first version to a second version, wherein the cluster of storage nodes comprises a plurality of storage nodes, and wherein the update procedure is used to serially update subsets of the plurality of storage nodes;
configure, by the storage node, a first job queue for storing a first set of jobs that were obtained by the storage node but were not initiated prior to entering the quiescent state and a second job queue for storing one or more jobs that were initiated at the storage node prior to entering the quiescent state;
refrain, by the storage node while in the quiescent state, from obtaining new jobs and from initiating the first set of jobs in the first job queue; and
continue, by the storage node while in the quiescent state, to execute the one or more jobs in the second job queue that were initiated at the storage node prior to entering the quiescent state.

16. The apparatus of claim 15, wherein the instructions are further executable by the processor to cause the apparatus to:
complete, by the storage node, at least a subset of the one or more jobs prior to an end of a quiescent period of the storage node.

17. The apparatus of claim 15, wherein the instructions are further executable by the processor to cause the apparatus to:

generate a plurality of threads for updating the cluster of storage nodes, wherein each thread of the plurality of threads is for updating a respective storage node of the cluster of storage nodes, and wherein each thread comprises a plurality of checkpoints associated with updating the respective storage node.

18. A non-transitory, computer-readable medium storing code that comprises instructions executable by a processor of an electronic device to cause the electronic device to:
enter, by a storage node of a cluster of storage nodes, a quiescent state based at least in part on an update procedure for updating software for the cluster of storage nodes from a first version to a second version, wherein the cluster of storage nodes comprises a plurality of storage nodes, and wherein the update procedure is used to serially update subsets of the plurality of storage nodes;
configure, by the storage node, a first job queue for storing a first set of jobs that were obtained by the storage node but were not initiated prior to entering the quiescent state and a second job queue for storing one or more jobs that were initiated at the storage node prior to entering the quiescent state;
refrain, by the storage node while in the quiescent state, from obtaining new jobs and from initiating the first set of jobs in the first job queue; and
continue, by the storage node while in the quiescent state, to execute the one or more jobs in the second job queue that were initiated at the storage node prior to entering the quiescent state.

19. The non-transitory, computer-readable medium of claim 18, wherein the instructions are further executable by the processor to cause the electronic device to:
complete, by the storage node, at least a subset of the one or more jobs prior to an end of a quiescent period of the storage node.

* * * * *